United States Patent
Seki et al.

(10) Patent No.: US 8,467,823 B2
(45) Date of Patent: *Jun. 18, 2013

(54) METHOD AND SYSTEM FOR CPRI CASCADING IN DISTRIBUTED RADIO HEAD ARCHITECTURES

(75) Inventors: Hiroyuki Seki, Yokohama (JP);
Hiroyuki Kiyanagi, Yokohama (JP);
Wei-Peng Chen, Fremont, CA (US);
Chenxi Zhu, Gaithersburg, MD (US);
Nien-Tai Kai Mao, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 333 days.

This patent is subject to a terminal disclaimer.

(21) Appl. No.: 12/731,052

(22) Filed: Mar. 24, 2010

(65) Prior Publication Data
US 2011/0237178 A1    Sep. 29, 2011

(51) Int. Cl.
*H04W 4/00*     (2009.01)
*H04W 72/00*    (2009.01)
*H04W 36/00*    (2009.01)
*H04B 7/00*     (2006.01)

(52) U.S. Cl.
USPC ........... 455/524; 455/453; 455/436; 370/328; 370/331

(58) Field of Classification Search
USPC .................. 455/453, 436, 524; 370/328, 331
See application file for complete search history.

(56) References Cited

U.S. PATENT DOCUMENTS

| | | | |
|---|---|---|---|
| 5,596,605 A * | 1/1997 | Kiyanagi et al. | 375/326 |
| 7,047,028 B2 | 5/2006 | Cagenius | |
| 8,032,183 B2 * | 10/2011 | Rudrapatna | 455/562.1 |
| 2003/0061422 A1 * | 3/2003 | Repice et al. | 710/107 |
| 2004/0190598 A1 * | 9/2004 | Seki et al. | 375/141 |
| 2006/0209752 A1 | 9/2006 | Wijngaarden et al. | 370/328 |
| 2008/0119198 A1 | 5/2008 | Hettstedt et al. | 455/453 |
| 2009/0022089 A1 | 1/2009 | Rudrapatna | 370/328 |
| 2010/0296816 A1 | 11/2010 | Larsen | 398/116 |
| 2011/0138198 A1 * | 6/2011 | Boss et al. | 713/310 |
| 2011/0213997 A1 * | 9/2011 | Kansal et al. | 713/324 |
| 2011/0236024 A1 * | 9/2011 | Mao | 398/115 |
| 2011/0264935 A1 * | 10/2011 | Shetty et al. | 713/320 |
| 2012/0236916 A1 * | 9/2012 | Kobayashi | 375/224 |

OTHER PUBLICATIONS

United States Notice of Allowance; U.S. Appl. No. 12/730,858; pp. 38, Dec. 18, 2012.

Unites States Office Action; U.S. Appl. No. 12/730,858; pp. 40, May 4, 2012.

* cited by examiner

*Primary Examiner* — Bobbak Safaipour
(74) *Attorney, Agent, or Firm* — Baker Botts L.L.P.

(57) ABSTRACT

A method of communicating between a base band unit and a plurality of remote radio heads includes the steps of receiving a first signal through an antenna in a first remote radio head, transmitting the first signal to a second remote radio head through a digital radio interface, receiving a second signal through an antenna in the second remote radio head, compensating for a delay accrued in the first signal, adding the first signal and the second signal to obtain a resulting signal, and transmitting the resulting signal to a base band unit through a digital radio interface.

14 Claims, 5 Drawing Sheets

METHOD AND SYSTEM FOR CPRI CASCADING IN DISTRIBUTED RADIO HEAD ARCHITECTURES

TECHNICAL FIELD OF THE INVENTION

The present invention relates generally to wireless communications and, more particularly, to a method and system for communicating via CPRI in a distributed radio head architecture.

BACKGROUND

Wireless telecommunications systems sometimes employ the use of picocell radio nodes to augment the system's coverage area. Picocell nodes are telecommunication devices smaller than traditional base stations, or macrocell nodes, and typically have a smaller range. Picocells may be deployed in locales and situations demanding extra capacity, or in areas that experience poor signal quality with the telecommunications systems. Picocells encounter scalability issues that affect the ability to deploy them in great number, including operational overhead, network traffic management scalability, and hand-off performance. These issues are more pervasive than in a wireless system implemented with macrocells. Current distributed radio equipment solutions utilizing cascaded radios are typically cascaded over a dedicated transport media. The only traffic across the transport network may be the data exchanged between radio equipment and a controller.

SUMMARY

In one embodiment, a method of communicating between a base band unit and a plurality of remote radio heads includes the steps of receiving a first signal through an antenna in a first remote radio head, transmitting the first signal to a second remote radio head through a digital radio interface, receiving a second signal through an antenna in the second remote radio head, compensating for a delay accrued in the first signal, adding the first signal and the second signal to obtain a resulting signal, and transmitting the resulting signal to a base band unit through a digital radio interface.

In a further embodiment, an article of manufacture includes a computer readable medium and computer-executable instructions carried on the computer readable medium. The instructions are readable by a processor. The instructions, when read and executed, cause the processor to receive a first signal through an antenna in a first remote radio head, transmit the first signal to a second remote radio head through a digital radio interface, receive a second signal through an antenna in the second remote radio head, compensate for a delay accrued in the first signal, add the first signal and the second signal to obtain a resulting signal, and transmit the resulting signal to a base band unit through a digital radio interface.

In yet a further embodiment, a system for telecommunications includes a base band unit, a backhaul network, and a cascaded chain of remote radio heads. The backhaul network is coupled to the base band unit. The cascaded chain of remote radio heads includes a first remote radio head coupled to a first set of one or more antennas and a second remote radio head coupled to a second set of one or more antennas, The second remote radio head is coupled to the first remote radio head through optical fiber. The cascaded chain of remote radio heads is coupled to the backhaul network. The base band unit communicates through a digital radio interface with the first remote radio head over the backhaul network. The first remote radio head communicates through the digital radio interface with the second remote radio head. The second remote radio head is configured to receive signals from the second set of antennas and communicate the signal to the first remote radio head. The first remote radio head is configured to receive a first signal from the first set of antennas, receive a second signal from the second remote radio head, compensate for a delay accrued in the second signal, add the first signal and second signal to obtain a resulting signal, and transmit the resulting signal to the base band unit through a digital radio interface.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
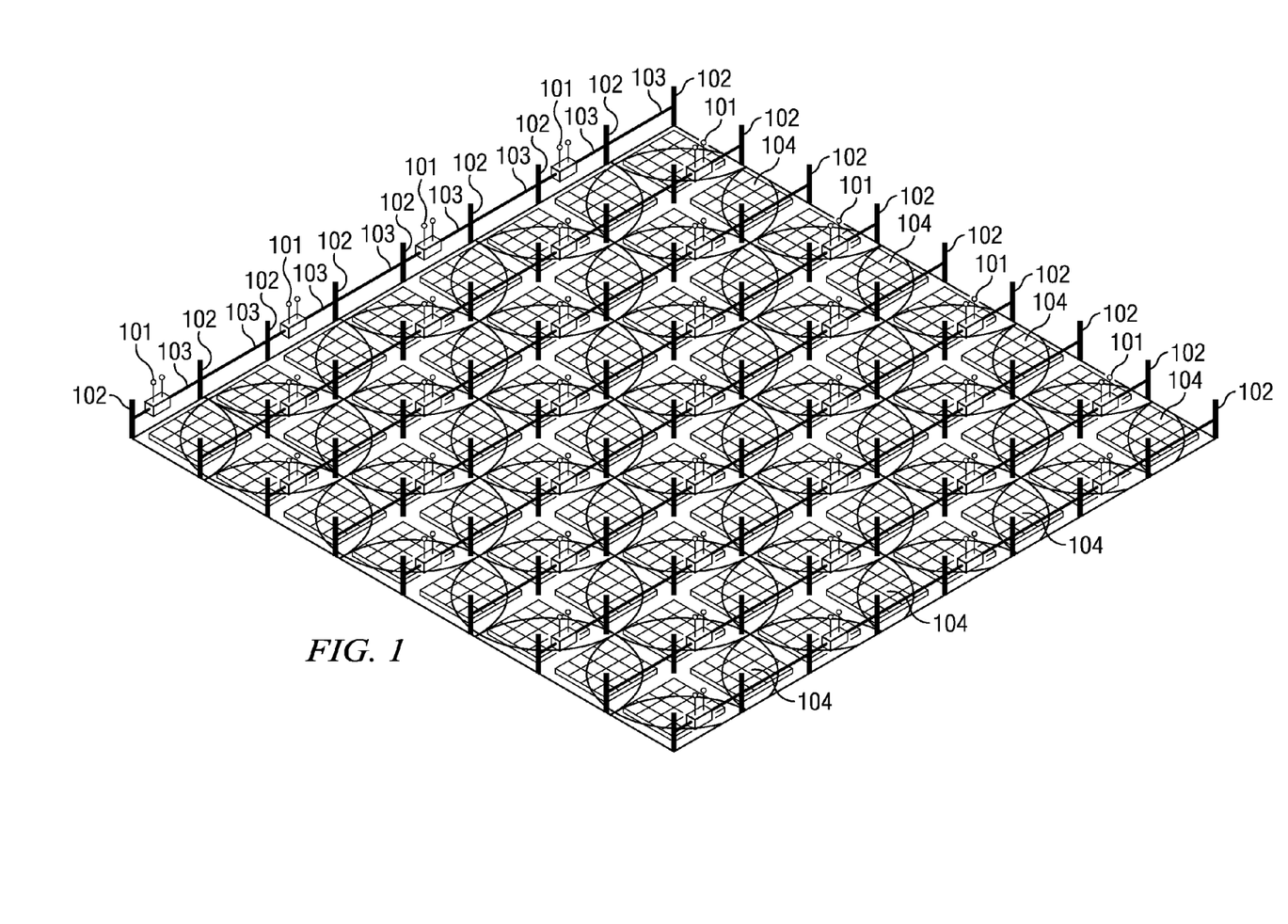
FIG. 1 is a diagram illustrating an example wireless communications network using picocells for facilitating mobile device access.

FIG. 1 illustrates an example wireless communications network using picocells for facilitating mobile device access. Picocells 101 are mounted on overhead, open-air cables 102 connected between utility poles 103. Each picocell 101 provides coverage to a coverage area 104. A mobile device in coverage area 104 will be able to communicate with the network coupled to picocells 101. Providing continuous access to the network coupled to picocells 101 as a mobile device moves between coverage areas 104 is a goal of the wireless communications network.

Figure 2:
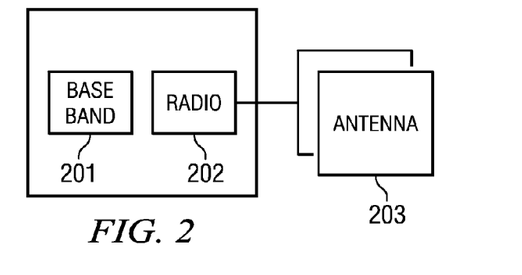
FIG. 2 is a diagram illustrating the various aspects of an example picocell device.

FIG. 2 illustrates the various aspects of a picocell device. A base band unit 201 controls communication between the larger communications network and mobile devices. The radio processor 202 is configured to transmit and receive signals to and from one or more antennas 203. Antenna 203 is the physical device that broadcasts and receives wireless signals to and from mobile devices.

A difficulty in providing an increasing number of picocell devices is that when creating the network, each picocell's base band unit must be provisioned, commissioned, and managed individually, in a similar fashion to base stations with larger coverage areas. However, since the picocell device's coverage area 104 is relatively small, many more picocells must be deployed for an equivalent amount of coverage. The result is that the overhead of provisioning, commissioning, and managing the picocell device must be repeated many more times when using picocell devices to cover a large area, when compared to a base stations with a larger coverage area.

Another difficulty when using picocells is the scalability of network traffic management as the number of picocells grows. In a long term evolution ("LTE") wireless communications network, data links are required between every cell in a cluster in order to facilitate fast and seamless hand-off between the different cells as a mobile device moves from one coverage area to another. In addition, a data link is required to connect the picocell to the service provider's core network. As a result, the number of connections required for N nodes is on the order of magnitude of N squared. Managing an exponentially growing number of connections is a scalability problem when considering the large number of picocells required to serve a large network area.

A third difficulty when using picocells is that when cascading them in long chains, a mobile device travelling through multiple picocell coverage areas generates multiple hand-offs, requiring action from the network to correctly predict the movement of the mobile device and hand-off the mobile device to the next picocell coverage area. This hand-off requires time and system resources. Generally speaking, moving from one picocell coverage area to another picocell coverage area requires an inter-node hard handoff. This requires, for example, finding a new target picocell to connect to the mobile device based on estimations of the mobile device's location, speed, the original picocell's signal strength and coverage area, and the target picocell's signal strength and coverage area. Once the new target picocell is determined, the original picocell communicates a handoff order comprising the target picocell's frequency or time slot to the mobile device. The target picocell informs the communications network and the communication link between the communications network and the mobile device is established through the target picocell. A common possible side effect may be a short loss in communication, or even a dropped communication connection. Since a picocell coverage area may be small, a mobile device may experience many handoffs as it moves through many picocell coverage areas.

One approach to addressing some of these issues may be to utilize a remote radio head means of implementing a picocell. In such a case, base band unit 201 is separate from the combination of the radio processor 202 and the antenna 203. The radio processor 202 in this configuration may be known as a remote radio head. In FIG. 1, each picocell 101 may be replaced by a remote radio head and multiple remote radio heads may be coupled to a single base station 201. However, when configuring the system to include cascaded chains of remote radio heads coupled to a base band unit, some difficulties remain. For example, the base band unit 201 requires a data connection to each remote radio head, and the resulting data throughput requirements limit the size of cascaded chains. In addition, such connections often occur over a dedicated network line. The present invention contemplates solutions to this problem while achieving the benefits of cascaded radio heads.

Figure 3:
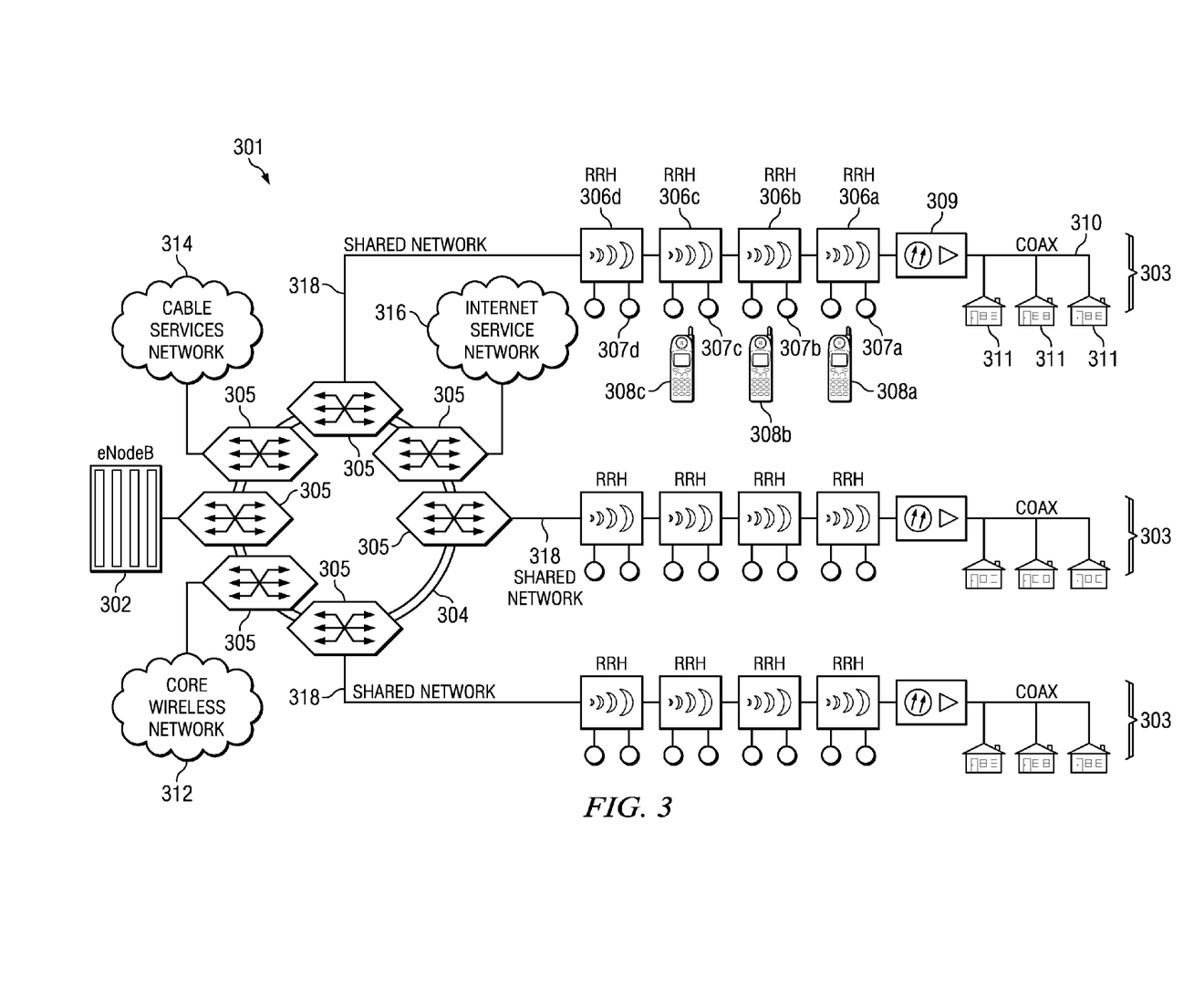
FIG. 3 is a diagram illustrating an example embodiment of a wireless communications network utilizing cascaded remote radio heads over a shared network.

FIG. 3 illustrates an example embodiment of the present invention for a wireless communications network 301 utilizing distributed cascaded remote radio heads over a shared network. Wireless communications network 301 may have one or more base band units 302. Base band unit 302 may be coupled to one or more mobile network clusters 303 via a general purpose, fiber-optic backhaul network 304 and shared network 318. Backhaul network 304 may carry general data telecommunications and/or multimedia traffic to and from networks and devices, such as cable services network 314, core wireless network 312, internet service network 316, land-based service subscribers 311, mobile devices 308, and other networks and devices not pictured. Backhaul network 304 may comprise a fiber-optic network. Shared network 318 may comprise a fiber, electromagnetic, or hybrid transmission lines. Shared network 318 may carry general data telecommunications and/or multimedia traffic to and from devices in or in communication with cluster 303 and networks connected to backhaul network 304. Shared network 318 may be coupled to backhaul network 304 by means of an optical switch 305. In one embodiment, optical switch 305 may comprise an optical add/drop multiplexer. Cluster 303 may be coupled to shared network 304. Base band unit 302 may be coupled to multiple clusters 303.

Each cluster 303 may comprise one or more remote radio heads 306 cascaded in a chain topology. The one or more remote radio heads 306 may be coupled to one other through optical fiber. Each remote radio head 306 may be coupled to one or more antennas 307. Antennas 307 send and receive wireless signals to and from one or more mobile devices 308.

Cluster 303 may also be coupled to an optical node 309. Optical node 309 may be configured to transfer signals from an optical fiber to an electromagnetic transmission line 310. In one embodiment, electromagnetic transmission line 310 comprises a coaxial cable transmission line. Optical node 309 may be coupled to one or more land-based service subscribers 311 through electromagnetic transmission line 310. Land-based service subscribers 311 may receive any number of services by being coupled to optical node 309, including cable television services, voice, or data.

The optical fiber coupling optical switch 305, remote radio heads 306, and optical node 309 in conjunction with the electromagnetic transmission line 310 coupling optical node 309 and land-based service subscribers 311 may comprise a shared network 118.

The wireless communications network may be coupled to a core wireless network 312 that may transmit voice, data, or other digital information. The core wireless network 312 may comprise one or more wireless or hard-wired networks. Core wireless network 312 may provide voice, data, or other digital information services to devices of wireless communications network 301. Core wireless network 312 may provide voice, data, or other digital information connections between remote devices (not shown) coupled to core wireless network 312 and devices of communications network 301. The core wireless network 312 may be coupled to the wireless communications network 301 through shared network 318 via an optical switch 305.

Wireless communications network 301 may be coupled to a cable services network 314 that may transmit television data, telephony data, or other data services. Cable services network 314 may comprise one or more networks. Cable services network 314 may provide television data, telephony data, or other data services to land-based service subscribers 311. Cable services network 312 may be coupled to wireless communications network 301 shared network 318 via an optical switch 305.

Wireless communications network 301 may be coupled to an internet service network 316 that may transmit digital data comprising telephony, internet, multimedia, or other services. The internet service network 316 may comprise one or more networks. Internet service network 316 may provide services to land-based service subscribers 311. Internet service network 316 may be coupled to the wireless communications network 301 through shared network 318 via an optical switch 305.

In operation, a voice or data connection may be established between a node in wireless communications network 301 (or in core wireless network 312) and mobile devices 308. For example, mobile device 308a may send a signal to wireless communications network 301 which is first received by the antennas 307a of a remote radio head 306a. Other remote radio heads 306b, 306c, 306d may also receive through antennas 307b, 307c, 307d the signal from mobile device 308a. Simultaneously, other mobile devices 308b, 308c, may be transmitting to wireless communications network 301 through one or more of the remote radio heads 306.

After receiving a wireless transmission from mobile device 308a, and possibly other mobile devices 308b, 308c, remote radio head 306a may process the received signals and transmit them via shared network 318 to the next upstream remote radio head 306b in the cascaded chain. Remote radio head 306b may have also received wireless transmissions through its antennas 307b from mobile devices 308a, 308b, 308c which are processed by remote radio head 306b. Remote radio head 306b may also receive a transmission from remote radio head 306a. Remote radio head 306b may add the signals received through its antennas 307b to the transmission from remote radio head 306a. The resulting signal may be transmitted via shared network 218 upstream in the cascaded chain of radio heads to the next remote radio head 307c. A similar process may occur utilizing remote radio heads 307c and 307d. The resulting transmission, representing the received signals from all mobile devices 308 communicating with cluster 303, may be added to the shared network 218. Shared network 218 may transport the received signals to backhaul network 304 via optical switch 305, whereupon the transmission reaches base band unit 302. Base band unit 302 may be coupled to core wireless network 312 to provide communication to mobile devices 308. Base band unit 302 may connect each transmitted signal through the backhaul network 304 to the appropriate destination, which may be in wireless communications network 301 or in core wireless network 312.

When data is transmitted from the destination node, which may be in wireless communications network 301 or in core wireless network 312, back to mobile devices 308, the data may flow through backhaul network 304 to the cluster 303 by way of optical switch 305 and shared network 318. Several such downstream data connections may be made to multiple mobile devices 308 on the cluster 303. A single composite signal composed of the multiple downstream connections may be broadcast simultaneously on all remote radio heads 306 in the cluster 303. Remote radio head 306a may receive the composite signal and broadcast it to relevant mobile devices 308 within range. The ability of a mobile device 308a to send and receive signals from a remote radio head 306a may constitute a voice or data connection with the wireless communications network 301 or core wireless network 312. When a mobile device 308a moves from the coverage area of one remote radio head 306a to the coverage area of another remote radio head 306b, no hand-off, hard or soft, may be necessary. When a mobile device moves from the coverage area of a cluster 303 of remote radio heads to a different cluster, an intra-node hand-off may be used instead of an inter-node hand-off. Thus, operation of wireless communications network 301 implemented with distributed radio heads may resemble the operation of a network implemented with macrocells, but with the benefits of a network implemented with picocells.

In addition to communicating with mobile devices 308, communications with land-based service subscribers 311 or other subscribers connected to cluster 303 may be provided by shared network 318. Backhaul network 304 may connect television, multimedia, internet, voice, or other data services to cluster 303. Communications with land-based service subscribers 311 may originate in cable services network 314, internet service network, or another provider in communication with backhaul network 304. The television, multimedia, voice, or other data services for land-based service subscribers may 311 be transported by shared network 318 between optical switch 305 and optical node 309. The data and services between optical node 309 and land-based service subscribers 311 may be transported by electromagnetic transmission line 310. Communications with land-based service subscribers 311 may happen simultaneously with voice and data connections between mobile devices 308 and wireless communications network 301.

A method of communication between remote radio heads 306 may comprise a digital radio interface. In one embodiment, Common Public Radio Interface ("CPRI") may be utilized. CPRI is an interface between radio equipment control (such as base band units) and radio equipment (such as base band units). The CPRI protocol specifies transport, connectivity, and control between these communications devices, specifically for layer 1 and layer 2. The CPRI protocol does not, however, specify how to accomplish a cascaded chain of remote radio heads without the significant data requirements mentioned above in the discussion of FIG. 1.

Figure 4:
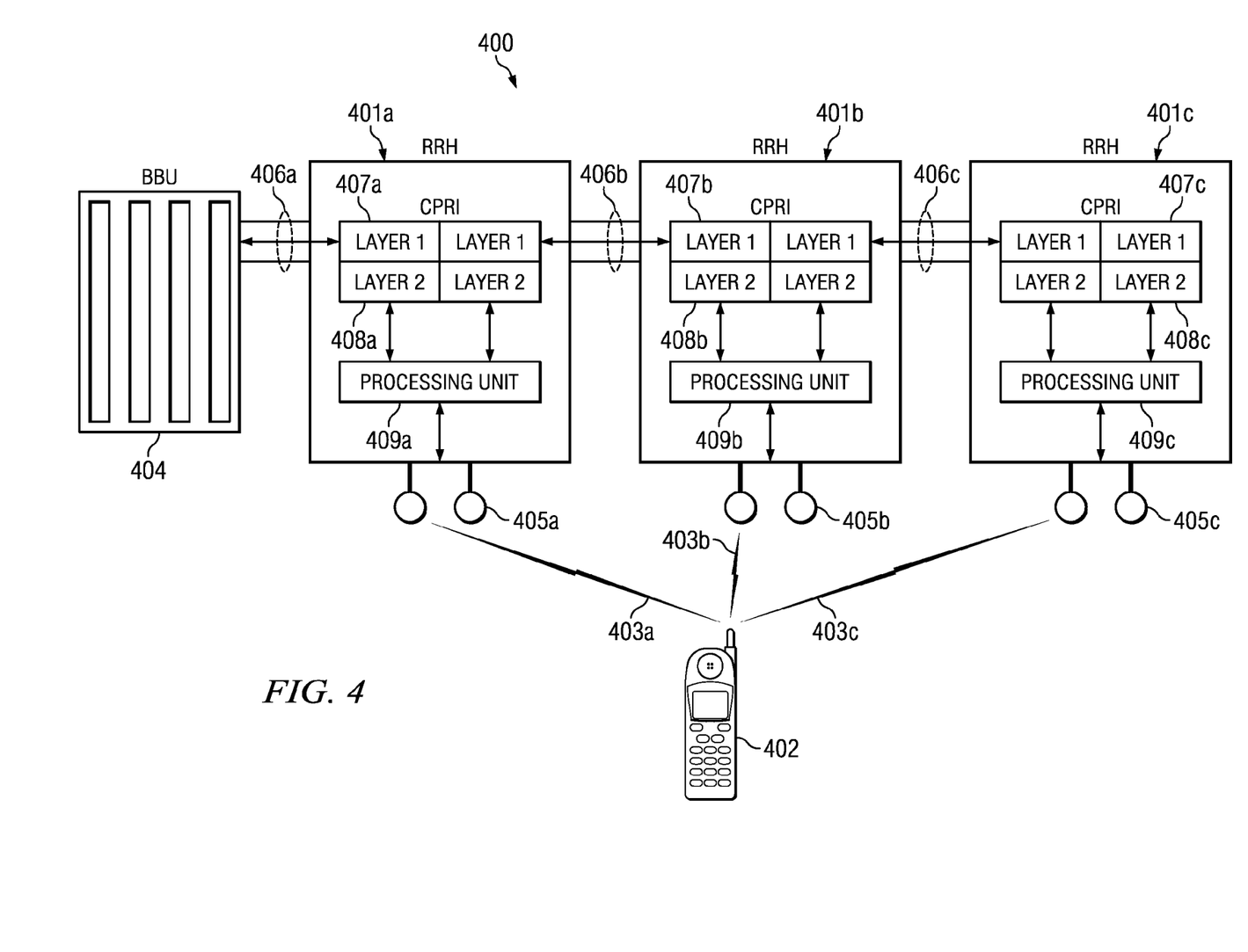
FIG. 4 illustrates an example embodiment of a system utilizing CPRI to communicate between a cascaded chain of remote radio heads.

FIG. 4 illustrates an example embodiment of a system 400 utilizing CPRI to communicate between a cascaded chain of remote radio heads. One or more remote radio heads 401a, 401b, 401c may be chained together using CPRI. Each remote radio head 401 may communicate with a wireless device 402 by sending and receiving wireless signals 403a, 403b, 403c to and from wireless device 402. Each remote radio head 401a, 401b, 401c may utilize a set of one or more antennas 405a, 405b, 405c to send and receive wireless signals 403a, 403b, 403c. Remote radio heads 401a, 401b, 401c are coupled to each other and to base band unit 404 through pairs of data links 406a, 406b, 406c. Pairs of data links 406 may be configured to carry upstream and downstream communication, and may be physically implemented with optical fiber. Pairs of data links 406 may comprise a CPRI link. Each remote radio head 401a, 401b, 401c may comprise a layer 1 module 407a, 407b, 407c. Layer 1 modules 407 may comprise any combination of hardware and/or software configurable to send and receive signals in a physical layer optical interface. Each remote radio head 401a, 401b, 401c may comprise a layer 2 module 408a, 408b, 408c. Layer 2 modules 408 may comprise any combination of hardware and/or software configurable to provide means of accessing or repackaging information being transported by layer 1 modules 407. Layer 2 modules 408 may comprise any combination of hardware and/or software configurable to implement a data link layer. A layer 1 module 407a, 407b, 407c may be coupled to its respective layer 2 module 408a, 408b, 408c. Each remote radio head 401a, 401b, 401c may comprise a processing unit 409a, 409b, 409c. Processing units 409 may be coupled to layer 2 modules 408 and to antennas 405. Processing units 409 may be configured to send/receive information about wireless signals 403 to/from antennas 405. Processing units 409 may be configured to send/receive data to/from layer 2 modules 408, or otherwise access information being transported by layer 1 modules 407 by way of layer 2 modules 408. Processing units 409 may be configured to process information, received or to be sent, in such a way to facilitate CPRI communication in the system 400 for between base band unit 404 and wireless device 402 through remote radio heads 401. In one embodiment, processing units 409 may be partially implemented by the radio processor 202 of FIG. 2.

Remote radio heads 401 and base band unit 404 may comprise any system, device, or apparatus configured to interpret and/or execute program instructions and/or process data. In certain embodiments, a remote radio head 401 or a base band unit 404 may comprise a processor, for example a microprocessor, microcontroller, digital signal processor (DSP), application specific integrated circuit (ASIC), or any other digital or analog circuitry configured to interpret and/or execute program instructions and/or process data. In some embodiments, a remote radio head 401 or a base band unit 404 may interpret and/or execute program instructions and/or process data stored in a memory. A memory be coupled to a remote radio head 401 or a base band unit 404 and may include any system, device, or apparatus configured to hold and/or house one or more memory modules. Each memory module may include any system, device or apparatus configured to retain program instructions and/or data for a period of time (e.g., computer-readable media).

In operation, wireless device 402 may broadcast a signal 403c. Remote radio head 401c may receive the signal 403c through its antennas 405c. Information about the signal 403c may be sent to processing unit 409c. Processing unit 409c may prepare the information for transport to the remainder of the wireless network and may use layer 2 module 408c to package information about the signal 403c to be sent by layer 1 module 407c. Information about signal 403c may be sent to remote radio head 401b through data link 406c.

Remote radio head 401b may receive information about signal 403c through layer 1 module 407b. Remote radio head 401b may receive signal 403b through its antennas 405b. Information about signal 403b may be sent to processing unit 409b. Processing unit 409b may access information about signal 403c by utilizing layer 2 module 408b to interface with layer 1 module 407b. Processing unit 409b may process information about signal 403c and signal 403b so as to accurately present the information to base band unit 404. Additional possible implementations of such operation of processing units 409 are given in FIG. 5, below. Processing unit 409b may use layer 2 module 408b to package information about signal 403b, or post-processing information about signals 403b, 403c, to be sent by layer 1 module 407b. The information may be sent to remote radio head 401a through data link 406b.

Remote radio head 401a may receive information about signals 403b and 403c through layer 1 module 407a. Remote radio head 401a may receive signal 403a through its antennas 405a. Information about signal 403a may be sent to processing unit 409a. Processing unit 409a may access information about signals 403b and 403c by utilizing layer 2 module 408a to interface with layer 1 module 407a. Processing unit 409a may process information about signals 403a, 403b, 403c so as to accurately present the information to base band unit 404. Processing unit 409a may use layer 2 module 408a to package information about signal 403a, or post-processing information about signals 403a, 403b, and 403c to be sent by layer 1 module 407a. The information may be sent to base band unit 404 through data link 406a.

Figure 5:
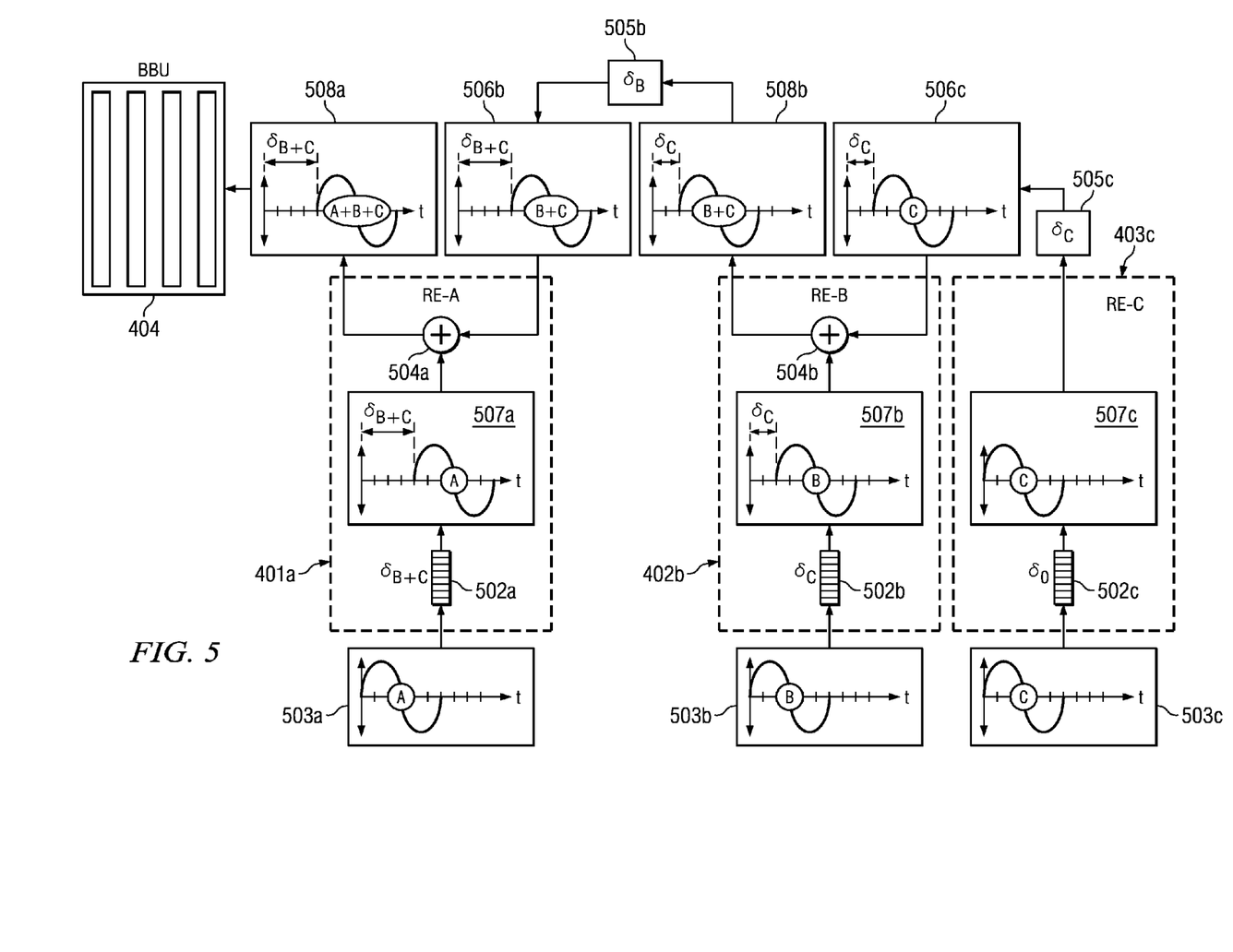
FIG. 5 is a diagram illustrating an example embodiment of upstream CPRI communication between cascaded remote radio heads, showing example signal processing; and, FIG. 6 is a flowchart illustrating an example embodiment of a method of communication over a shared network.

FIG. 5 illustrates an example embodiment of a system 500 of upstream CPRI communication between cascaded remote radio heads showing example signal processing. One or more remote radio heads 401a, 401b, 401c may be coupled together using CPRI. As noted above, each remote radio head 401 may receive a signal 503a, 503b, 503c through its antennas from a wireless device. Each remote radio head 401 may comprise elements for processing wireless signals 503. For example, each remote radio head 401 may comprise a delay compensation buffer 502a, 502b, 502c, as well as an adder 504a, 504b for adding the wireless signals 503a, 503b received through antennas to signal received from another remote radio head 401. Each remote radio head 401 may be configured to transmit the resultant signal using the CPRI protocol upstream to the next remote radio head 401; or in the case of remote radio head 401a, to the base band unit 404.

In operation, remote radio head 401c receives a wireless signal 503c through its antennas (not shown). Because remote radio head 401c is the last remote radio head in the cascaded chain, it may simply transmit the signal to remote radio head 401b using the CPRI protocol. Remote radio head 401b does not receive the signal from remote radio head 401c instantaneously; there may have been some delay 505c. Thus, the received signal 506c is the wireless signal 503c with some delay 505c. Remote radio head 401b may also receive a wireless signal 503b from its own antennas. To correctly add the wireless signal 503b to the received signal 506c, delay compensation buffer 502b may add an estimation of delay 505c to wireless signal 503b, resulting in delay-compensated wireless signal 507b. Delay compensation buffer 502b may be configured at installation, taking into account the distance between remote radio heads 401b, 401c, the equipment used, and any other factors that contribute to delay. Alternatively, the delay 505c may be measured during installation and delay compensation buffer 502b set accordingly. The two signals, delay-compensated wireless signal 507b and received signal 506c, may be added using digital signal bits addition. The resulting signal 508b may comprise wireless signals 503b, 503c adjusted for time or phase associated with delay 505c. The resulting signal 508b may be transmitted using CPRI to the next upstream remote radio head 401a.

Similarly, remote radio head 401a may receive received signal 506b that comprises the resulting signal 508b and some delay 505b. Remote radio head 401a may also receive a wireless signal 503a from its own antennas.

To correctly add the wireless signal 503a to the received signal 506b, delay compensation buffer 502a may add an estimation of delays 505b, 505c to wireless signal 503a, resulting in delay-compensated wireless signal 507a. Delay compensation buffer 502a may be configured at installation, taking into account the distance between remote radio heads 401a, 401b, 401c, the equipment used, and any other factors that contribute to delay. Alternatively, the delays 505b, 505c may be measured during installation and delay compensation buffer 502a set accordingly. The two signals, delay-compensated wireless signal 507a and received signal 506b may be added using digital signal bits addition. The resulting signal 508a may comprise wireless signals 503a, 503b, 503c adjusted for time or phase associated with delays 505b, 505c. The resulting signal 508a may be transmitted using CPRI to the base band unit 404.

In one embodiment, the digital signal bits addition may be accomplished by sampling, at each remote radio head, a particularly frequency of the wireless signal with an accuracy of twelve bits. Using digital signal bits addition, three bits may be allocated for carry-over bits, resulting in the ability to cascade up to eight remote radio heads with a 1.2 Gbps fiber connection for bidirectional traffic. In a further embodiment, cascading remote radio heads may be based upon the CPRI standard, version 4. In yet a further embodiment, additional remote radio heads may be supported with a larger word size.

Figure 6:
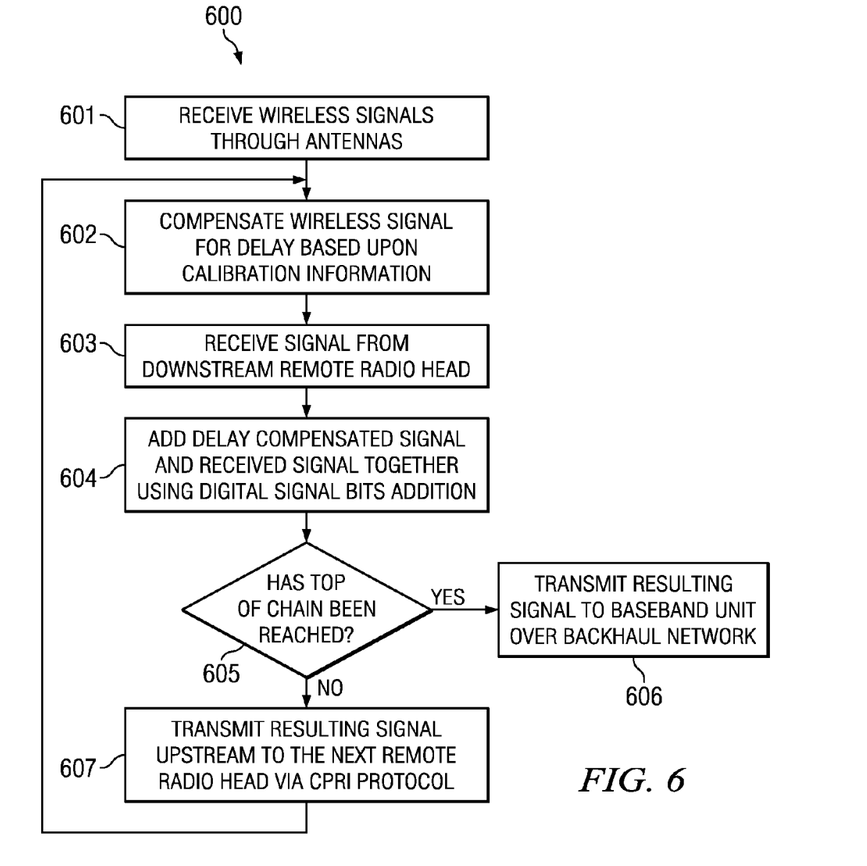

FIG. 6 is a diagram illustrating an example embodiment of a method 600 of upstream communication for a cascaded chain of remote radio heads over a shared network. Simultaneously, upstream communication with wireless mobile devices, as well as bi-directional communication with land based service subscribers, may be possible. Upstream communications may be of the form wherein a wireless device may send a signal, packet, or transmission to a device in the core wireless network through a remote radio head. Downstream communications may be of the form wherein a device in core wireless network may send a signal, packet, or transmission to a wireless device through a remote radio head.

For upstream mobile communications, in step 601 wireless signals may be obtained from one or more mobile devices in one more remote radio heads in a single cluster. Each remote radio head may receive the wireless signals through its own antennas. For all the remote radio head devices in a single cluster, obtaining wireless signals may happen simultaneously. In step 602, the wireless signal may be compensated for the cumulative delay occurring in all upstream wireless signal acquisitions. The compensation may be configured at installation, taking into account the distance between the remote radio head and the downstream remote radio heads. As a result, the compensated wireless signal will have minimal time or phase differences from signals received in step 603. If the remote radio head is at the bottom of the cascaded chain of remote radio heads, no compensation may be necessary. In step 603, the remote radio head may receive a signal from a downstream remote radio head, the signal containing the received wireless radio signals received by all downstream remote radio heads. If the remote radio head is at the bottom of the cascaded chain of remote radio heads, the remote radio head might not receive a signal from a downstream remote radio head. In step 604, the delay compensated wireless signal and the received signal may be added together using digital signal bits addition. In step 605, it may be determined whether or not the top of the chain of remote radio heads has been reached. If the top of the chain of remote radio heads has been reached, then in step 606, the resulting signal may be transmitted to the base band unit. The resulting signal in this step may represent the received signals from all mobile devices communicating with the cluster. If the top of the chain of remote radio heads has not been reached, then in step 607, the resulting signal may be transmitted upstream to the next remote radio head via the CPRI protocol. Steps 602-607 may be repeated for the next upstream remote radio head. For downstream mobile communications, an inbound signal to a wireless device in communication with a cluster may be routed over the backhaul network to the appropriate cluster. The signal may be routed to each remote radio head in the cluster using a single CPRI link. The signal may be broadcast simultaneously through each remote radio head's antennas and received by the wireless device.

For communications with land based service subscribers, an inbound signal to a land based service subscriber coupled to an optical node, the optical node coupled to a cluster, may be routed over the backhaul network to the appropriate cluster. The signal may be transported over fiber through remote radio heads. The signal may then be routed over an electromagnetic transmission line to the target land-based service subscriber. These steps may describe a downloading process; an uploading process may be accomplished simply by reversing the order of the steps.

Although FIG. 6 discloses a particular number of steps to be taken with respect to an example method 600, method 600 may be executed with more or fewer steps than those depicted in FIG. 6. In addition, although FIG. 6 discloses a certain order of steps to be taken with respect to method 600, the steps comprising method 600 may be completed in any suitable order. For example, steps 602-606 may be conducted in parallel, simultaneously or at different times, at each remote radio head within the cascaded chain of remote radio heads. In addition, step 603 may be completed before completing step 602, since both steps are independent of each other and are predicate to step 604.

Method 600 may be implemented using the network of FIG. 3, the system of FIG. 5, or any other system operable to implement method 600. In certain embodiments, method 600 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method of communicating between a base band unit and a plurality of remote radio heads, comprising the steps of:
   receiving a first signal through an antenna in a first remote radio head;
   transmitting the first signal to a second remote radio head through a digital radio interface;
   receiving a second signal through an antenna in the second remote radio head;
   compensating for a delay accrued in the first signal;
   adding the first signal and the second signal to obtain a resulting signal; and
   transmitting the resulting signal to a base band unit through a digital radio interface,
   wherein the digital radio interface is Common Public Radio Interface ("CPRI").

2. The method of claim 1, wherein adding the first signal and the second signal to obtain a resulting signal further comprises using digital signal bits addition.

3. The method of claim 2, wherein using digital signal bits addition further comprises utilizing a fifteen-bit word.

4. The method of claim 1, wherein the first signal is compensated for the delay accrued in the first signal.

5. The method of claim 1, wherein the second signal is compensated for the delay accrued in the first signal.

6. The method of claim 1, wherein the delay accrued in the first signal comprises delay due to transmission of the first signal to the second remote radio head.

7. The method of claim 6, wherein the delay accrued in the first signal further comprises delay due to transmission of a third signal to the second remote radio head.

8. An article of manufacture comprising:
   a non-transitory computer readable medium; and
   computer-executable instructions carried on the non-transitory computer readable medium, the instructions readable by a processor, the instructions, when read and executed, for causing the processor to:
   receive a first signal through an antenna in a first remote radio head;
   transmit the first signal to a second remote radio head through a digital radio interface;
   receive a second signal through an antenna in the second remote radio head;
   compensate for a delay accrued in the first signal;
   add the first signal and the second signal to obtain a resulting signal; and transmit the resulting signal to a base band unit through a digital radio interface, wherein the digital radio interface is Common Public Radio Interface ("CPRI").

9. The article of claim 8, wherein adding the first signal and the second signal to obtain a resulting signal further comprises using digital signal bits addition.

10. The article of claim 9, wherein using digital signal bits addition further comprises utilizing a fifteen-bit word.

11. The article of claim 8, wherein the first signal is compensated for the delay accrued in the first signal.

12. The article of claim 8, wherein the second signal is compensated for the delay accrued in the first signal.

13. The article of claim 8, wherein the delay accrued in the first signal comprises delay due to transmission of the first signal to the second remote radio head.

14. The article of claim 13, wherein the delay accrued in the first signal further comprises delay due to transmission of a third signal to the second remote radio head.

\* \* \* \* \*